Patented Jan. 18, 1938

2,105,806

UNITED STATES PATENT OFFICE 2,105,806

SUBSTITUTED SECONDARY AMINES AS ANTIOXIDANTS FOR DETERIORABLE ORGANIC COMPOSITIONS

Albert M. Clifford, Stow, Ohio, assignor to Wingfoot Corporation, Wilmington, Del., a corporation of Delaware No Drawing. Application December 7, 1932, Serial No. 646,218

27 Claims. (Cl. 18—50)

This invention relates to the retarding of the ageing of deteriorable organic compositions; more particularly, to the use in rubber, balata, gutta percha, transformer oils, gasoline and other deteriorable organic compositions of age retarders or antioxidants of the kind hereinafter set forth. The substances to which the invention relates have been found by actual test to protect against deterioration from such influences as heat, light and oxygen. They have also been found in the case of rubber to materially enhance the resistance to deterioration by flexing. In general, they accomplish various desirable ends, among them, in the case of rubber, that of imparting improved tensile strength to the treated product and, in the case of gasoline, of preventing the formation of gums and gummy materials.

Substances which may be employed as antioxidants in accordance with the teachings of the present invention are, or may be regarded as, secondary and tertiary amines of the type formula (A).N.(R).X.(B) wherein (R) is an alkyl, aryl or aralkyl radical attached by either a single or a double bond to N and by a single bond to X, such radical being preferably unsubstituted, but having, if desired, hydroxy, amino, nitro, halogen, alkoxy, aryloxy, aralkoxy or other substituents. In the formula, X represents oxygen, sulfur, selenium or tellurium, all of which are members of Group VI of the Periodic System, and N stands, as preferred, for a single nitrogen atom, for the nitrogen-containing group =N—H, or for the nitrogen containing group

Group (A) embraces radicals selected from the alkyl hydrocarbons in general, among them halogen alkyl, nitro alkyl, amino alkyl, hydroxy alkyl, alkoxy alkyl and like radicals. Unless (R) is attached to N by two bonds or N represents either the nitrogen-containing group =NH or the nitrogen-containing group

conditions under which Group (A), like Group (B), can embrace one and only one univalent radical, Group (A) may consist either of one bivalent radical or of two univalent radicals, the latter, where present, being either like or unlike each other. Group (B) embraces radicals selected from the hydrocarbons generally, whether substituted or unsubstituted; among them being, for example, alkyl, aryl, aralkyl; halogen alkyl, halogen aryl, halogen aralkyl; nitro alkyl, nitro aryl, nitro aralkyl; amino alkyl, amino aryl, amino aralkyl; hydroxy alkyl, hydroxy aryl, hydroxy aralkyl; alkoxy alkyl, alkoxy aryl, alkoxy aralkyl; aryloxy alkyl, aryloxy aryl, aryloxy aralkyl and like radicals. Group (B) may also comprise a heterocyclic radical, differing in this respect from Group A; but the latter, as is also true of (R), may represent a bivalent hydrocarbon chain constituting part of a nitrogen heterocyclic radical embodying N where the latter is a single nitrogen atom.

Preferably, either (R) or Group (B) contains an aryl radical; hence, unless (R) represents such a radical, there is preferably one contained in Group (B).

Examples of compounds falling within the type formula (A).N.(R).X.(B) are diethyl amino methyl beta naphthyl ether, wherein Group (A) includes the two ethyl radicals, N represents nitrogen, (R) is the methyl radical, X is the oxygen atom and Group (B) is made up of the naphthyl nucleus; p-toloxy phenyl isopropyl nitrosamine, wherein (R) is the phenyl group, N and X are, respectively, the group

and the ethereal oxygen atom, and Groups (A) and (B) comprise the terminal isopropyl and tolyl nuclei, respectively; naphthoxy benzyl butyl amine, wherein Group (A) comprises the butyl group, N is the nitrogen-containing group =N—H, (R) stands for the benzyl radical, X is oxygen and Group (B) consists of the naphthyl nucleus; and N-butyl phenetidine, in which Group (A) is made up of the butyl radical, N represents the nitrogen-containing group =N—H. (R) stands for the phenyl nucleus, X is oxygen, and Group (B) is composed of the ethyl group attached to the oxygen. An example of a compound in which X represents tellurium is p-dimethylamino phenyl naphthyl telluride, wherein Group (A) includes the two methyl radicals, N represents nitrogen, (R) is the phenyl group, X is tellurium, and Group (B) comprises the naphthyl nucleus.

Still other examples of compounds which fall within the scope of this invention are 2-chlor 4-ethylamino phenyl ortho tolyl ether, p-methylamino p' hydroxy diphenyl ether, o-methylamino m-hydroxy phenyl tolyl ether, butylamino methyl phenyl ether, 4-diethylamino naphthol tolylol ether, 1-isopropylamino 4- ethoxy benzene, 3-6-dichlor beta naphthoxy propyl dipropyl amine, dimethylamino methyl alpha naphthyl ether, ethyl butyl amino methyl ortho tolyl ether, o-octylamino p-ethoxy phenol, p-diethylamino phenyl isopropyl ether, ethyl butyl amino beta naphthyl butyl ether, dimethyl amino methyl o-resorcyl ether, o-cresyloxy ethyl dibutyl amine, p-methoxy phenyl beta naphthylol amine, propoxy naphthyl diethyl amine, dimethylamino methyl beta naphthyl thio ether, propyl amino ethyl m-tolyl thio ether, p-dimethylamino o-tolyl beta naphthyl telluride, o-butylamino diphenyl telluride, p-methylamino phenyl o-tolyl selenide, p-dimethylamino o-tolyl beta naphthyl selenide, phenoxy ethyl butyl nitrosamine, ethyl nitrosamino beta naphthyl tolyl ether, and meta butyl nitrosamino diphenyl ether.

Further examples are p-methylamino p' amino diphenyl ether, p-methyl amino p' amino dixylyl ether, p-methyl amino p' amino di m-tolyl ether, p-ethyl amino p' amino diphenyl ether, p-ethyl amino p' amino di m-tolyl ether, p-isopropyl amino p' amino di m-tolyl ether, p-isopropyl amino p' amino diphenyl ether, p-butyl amino p' amino di o-tolyl ether, p-dimethyl amino p' amino diphenyl ether, p p' tetra methyl diamino diphenyl ether, p p' tetra methyl diamino di m-tolyl ether, p p' tetra ethyl diamino diphenyl ether, p p' tetra isopropyl diamino di m-tolyl ether, p p' tetra ethyl diamino di m-tolyl ether, p p' dimethyl diamino diphenyl ether, p p' dimethyl diamino ditolyl ether, p p' diethyl diamino diphenyl ether, p p' diethyl diamino dixylyl ether, 2-dimethyl amino 2' amino diphenyl ether, 4-diethyl amino 4' amino diphenyl ether, 4 di isopropyl amino 4' amino diphenyl ether, 2 2' tetra methyl diamino diphenyl ether, cyclohexyl amino ethyl beta naphthyl ether, cyclohexyl amino methyl phenyl ether, cyclohexyl amino ethyl tolyl ether, piperidyl ethyl naphthyl ether, N-butylamino ethyl beta naphthyl ether, methylene diamino biphenylene oxide, formyl 2-amino biphenylene oxide, p-naphthylamino p' diethylamino diphenyl ether, and p hydroxy phenylamino p' dibutylamino diphenyl ether.

In general, methods of preparing these antioxidants will suggest themselves. For instance, dimethyl amino methyl beta naphthyl ether may be prepared by treating beta naphthol dissolved in alcohol with dimethyl amine and formalin:

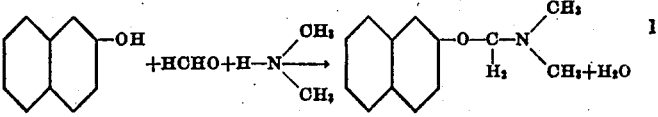

N-butyl p-amino phenyl p-cresyl ether, a material falling within the scope of the present invention, may be prepared by reacting butylamine and p-chlor phenol in an autoclave to produce N-butyl p-amino phenol

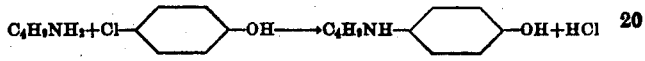

which may be converted to the corresponding sodium phenolate by reaction with sodium hydroxide. Thereafter the phenolate is reacted with p-brom-toluene in the presence of zinc chloride

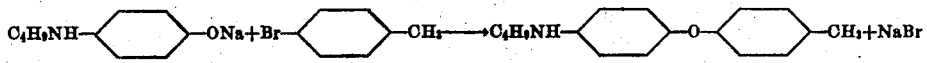

Para ethoxy phenyl butyl amine may be prepared by the action of p-phenetidine on a butyl halide or on butanol in the presence of suitable catalysts:

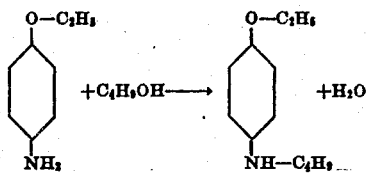

N-isopropyl o-amino m-cresyl p-hydroxy phenyl ether, also falling within the scope of the present invention, may be prepared by the interaction of o-amino m-cresol, acetone and formic acid to form N-isopropyl o-amino m-cresol

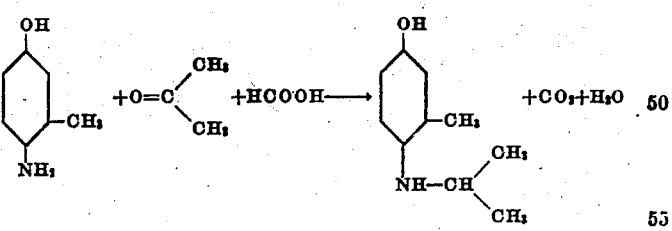

treating this product with sodium hydroxide to form the corresponding sodium phenolate and reacting the resultant product with p-brom phenol in the presence of active copper

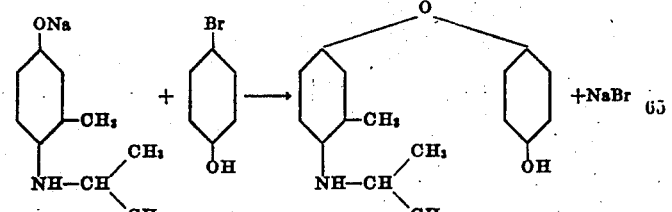

Still other methods which it is not necessary to describe in this application may be employed where circumstances permit, such methods being found in the literature of chemistry.

It is to be understood that the invention is not limited to any specific method of preparing the antioxidants or, regardless of illustrative references herein, to rubber. The antioxidants of the invention, however, may be employed advantageously in substantially any of the standard rubber formulae, the following being one in which they have been found to give excellent results:

Formula A

| | Parts |
|---|---|
| Extracted pale crepe | 100 |
| Zinc oxide | 5 |
| Hexamethylene tetramine | 1 |
| Sulfur | 4 |
| Stearic acid | 1½ |
| Antioxidant | 1 |

As pointed out above, they may also be employed in transformer oils, gasoline, etc.

Rubber samples prepared in accordance with the foregoing formula were subjected to vulcanization for varying periods of time and then tested to ascertain their physical properties. One set from each type of stock was tested immediately for tensile strength and elasticity while a second set was subjected to ageing in a Bierer-Davis bomb for 6 days in oxygen at 50 degrees C. and 150 pounds per square inch. At the conclusion of the 6 day period the samples were removed from the bomb and subjected to physical tests corresponding to those conducted upon the unaged samples. It is evident from the following tables, based on these experiments, that rubber compositions containing even small proportions of the antioxidants of this invention resist deterioration remarkably well. Similar compositions not containing the antioxidants upon being subjected to corresponding tests increase in weight in the neighborhood of 10% and lose almost all their tensile strength and elasticity.

In the following data, the tests for dimethyl amino methyl beta naphthyl ether and diethyl amino methyl beta naphthyl ether were obtained from a rubber compounded according to the formula given above.

| Cure | Original | | 500% | 700% | Aged | | 500% | 700% | Percent. wt. inc. |
|---|---|---|---|---|---|---|---|---|---|
| | Tens. | Elg. | | | Tens. | Elg. | | | |

Dimethyl amino methyl beta naphthyl ether

| 30/285 | 80 | 830 | 13 | 39 | 45 | 730 | 13 | 37 | .87 |
| 50 | 150 | 815 | 22 | 77 | 60 | 655 | 25 | | 1.17 |
| 110 | 165 | 750 | 31 | 120 | 90 | 650 | 37 | | 1.55 |

Diethyl amino methyl beta naphthyl ether

| 30/285 | 110 | 850 | 16 | 48 | 65 | 740 | 17 | 51 | .55 |
| 50 | 175 | 805 | 27 | 96 | 100 | 705 | 29 | 97 | .81 |
| 110 | 185 | 735 | 39 | 150 | 120 | 675 | 42 | | 1.37 |

Additional tests were made using N-butyl amino ethyl beta naphthyl ether and cyclohexyl amino ethyl beta naphthyl ether in the following formulae:

Formula B

| | Parts |
|---|---|
| Extracted rubber | 100 |
| Zinc oxide | 5 |
| Sulfur | 3 |
| Hexamethylene tetramine | 1 |
| Antioxidant | 1 |

Formula C

| | Parts |
|---|---|
| Smoked sheet | 100 |
| Carbon black | 0.6 |
| Zinc oxide | 92.6 |
| Sulfur | 3.5 |
| Iron oxide | 0.8 |
| Diphenylguanidine | 0.7 |
| Antioxidant | 5 |

Using Formula B the following results were obtained:

| Cure | Original | | 500% | 700% | Ages 6 days O₂ bomb 150# 50° C. | | | |
|---|---|---|---|---|---|---|---|---|
| | Tens. | Elong. | | | Tens. | Elong. | 500% | 700% |

N-butyl amino ethyl beta naphthyl ether

| 35/285 | 102 | 805 | 20 | 58 | 80 | 815 | 17 | 43 |
| 50 | 132 | 805 | 23 | 72 | 116 | 795 | 24 | 69 |
| 70 | 140 | 725 | 36 | 122 | 124 | 720 | 34 | 110 |

Cyclohexyl amino ethyl beta naphthyl ether

| 35/285 | 118 | 870 | 13 | 43 | 106 | 835 | 13 | 47 |
| 50 | 129 | 780 | 20 | 80 | 106 | 735 | 20 | 85 |
| 70 | 162 | 780 | 24 | 100 | 146 | 780 | 25 | 103 |

The following results were obtained by incorporating the same antioxidants in a rubber mix according to Formula C:

| Cure | Original | | 300% | 500% | Aged 7 hrs. air bomb 80# 114° C. | | | |
|---|---|---|---|---|---|---|---|---|
| | Tens. | Elong. | | | Tens. | Elong. | 300% | 500% |

N-butyl amino ethyl beta naphthyl ether

| 35/285 | 230 | 635 | 47 | 128 | 62 | 520 | 28 | 59 |
| 50 | 218 | 575 | 57 | 153 | 70 | 515 | 34 | 68 |
| 70 | 222 | 585 | 57 | 154 | 57 | 555 | 33 | |

Cyclohexyl amino ethyl beta naphthyl ether

| 35/285 | 220 | 640 | 39 | 120 | 64 | 490 | 28 | |
| 50 | 222 | 605 | 49 | 140 | 104 | 540 | 38 | 92 |
| 70 | 232 | 595 | 55 | 156 | 112 | 530 | 42 | 100 |

From the foregoing it is evident that the compounds herein disclosed are highly suitable as age resisters of rubber and other organic products which undergo deterioration under the influences of heat, light and oxygen. Not only do the compounds of the present invention counteract the effects of such influences, but they tend to impart other highly desirable qualities, such, for example, as increased resistance to deterioration by flexing.

It is to be understood that as hereinafter used the term "benzenoid" embraces phenyl and naphthyl groups, which, as preferred, do or do not contain substituents, such substituents being, for example, alkyl, alkoxy, amino and like groups. Also, by the term "rubber" it is meant to include rubber, latex, balata, gutta percha, guayule, rubber isomers, rubber conversion products and similar materials. It will be apparent that numerous changes may be made in the procedure to be followed and the chemicals employed without departing from the inventive concept. It is in-

What is claimed is:

1. A method of preserving rubber which comprises incorporating therein an age-resister comprising an alkyl amino di-hydrocarbon ether.

2. A method of preserving rubber which comprises incorporating therein an age-resister comprising an alkyl amino alkyl aryl ether.

3. A method of preserving rubber which comprises incorporating therein an age-resister comprising dialkyl amino alkyl aryl ether.

4. A method of preserving rubber which comprises incorporating therein an age-resister comprising an alkyl amino alkyl benzenoid ether.

5. A method of preserving rubber which comprises incorporating therein an age-resister comprising dialkyl amino alkyl benzenoid ether.

6. A method of preserving rubber which comprises incorporating therein dimethyl amino methyl naphthyl ether.

7. A method of preserving rubber which comprises incorporating therein diethyl amino methyl naphthyl ether.

8. A method of preserving rubber which comprises incorporating therein an age-resister comprising compound of the formula $$(A)n.N.(R).X.(B)$$

wherein Group (A) is selected from among the alkyl radicals and $n$ is one or two; N represents nitrogen, the group=N—H, or the group

(R) is an alkyl radical; X represents a non-metal of the group oxygen, sulfur, selenium and tellurium, and Group (B) is a benzenoid hydrocarbon radical.

9. A method of preserving rubber which comprises incorporating therein an age-resister comprising compound of the formula $$(A)n.N.(R).X.(B)$$

wherein Group (A) is selected from among the alkyl radicals and $n$ is one or two; N represents nitrogen; (R) is an alkyl radical; X represents oxygen, and Group (B) is a benzenoid hydrocarbon radical.

10. Rubber having incorporated therein an age-resister comprising an alkyl amino di-hydrocarbon ether.

11. Rubber having incorporated therein an age-resister comprising an alkyl amino alkyl aryl ether.

12. Rubber having incorporated therein an age-resister comprising an alkyl amino alkyl benzenoid ether.

13. Rubber having incorporated therein an age-resister comprising dialkyl amino alkyl benzenoid ether.

14. Rubber having incorporated therein dimethyl amino methyl naphthyl ether.

15. Rubber having incorporated therein diethyl amino methyl naphthyl ether.

16. A method of preserving rubber which comprises incorporating therein an ethereal compound having the formula (A)N(R)O(B) wherein (A) consists of two independent aliphatic hydrocarbon radicals, (B) is an organic radical connected by a single bond to the oxygen atom, and (R) is an aliphatic hydrocarbon radical containing not more than four hydrogen atoms.

17. A method of preserving rubber which comprises incorporating therein an ethereal compound having the formula (A)N(R)O(B) wherein (A) consists of two independent methyl radicals, (B) is a polynuclear aromatic radical connected by a single bond to the oxygen atom, and (R) is an aliphatic hydrocarbon radical containing not more than four hydrogen atoms.

18. A method of preserving rubber which comprises incorporating therein an ethereal compound having the formula (A)N(R)O(B) wherein (A) consists of two independent methyl radicals, (B) is an aromatic radical connected by a single bond to the oxygen atom, and (R) is an aliphatic hydrocarbon radical containing not more than four hydrogen atoms.

19. The process of manufacturing a vulcanized rubber product possessing age resisting characteristics which comprises heating rubber and sulfur in the presence of an antioxidant comprising a reaction product of substantially equimolecular proportions of a mono-hydroxy substituted aromatic hydrocarbon, a straight chain aliphatic secondary amine containing less than five carbon atoms and a saturated aliphatic aldehyde.

20. The process of manufacturing a vulcanized rubber product possessing age resisting characteristics which comprises heating rubber and sulfur in the presence of an antioxidant comprising a reaction product of substantially equimolecular proportions of a mono hydroxy substituted aromatic hydrocarbon, a secondary aliphatic amine containing less than five carbon atoms, and a saturated aliphatic aldehyde.

21. The process of manufacturing a vulcanized rubber product possessing age resisting characteristics which comprises heating rubber and sulfur in the presence of an antioxidant comprising a reaction product of substantially equimolecular proportions of a phenol, a straight chain secondary aliphatic amine containing less than five carbon atoms and a saturated aliphatic aldehyde.

22. The process of manufacturing a vulcanized rubber product possessing age resisting characteristics which comprises heating rubber and sulfur in the presence of an antioxidant comprising a reaction product of substantially equimolecular proportions of a phenol, diethylamine and formaldehyde.

23. An age resisting rubber product comprising the vulcanization product of a rubber stock containing prior to the vulcanization of said stock a reaction product of substantially equi-molecular proportions of a mono-hydroxy substituted aromatic hydrocarbon, a straight chain aliphatic secondary amine containing less than five carbon atoms and a saturated aliphatic aldehyde.

24. An age resisting rubber product comprising the vulcanization product of a rubber stock containing prior to the vulcanization of said stock a reaction product of substantially equi-molecular proportions of a mono hydroxy substituted aromatic hydrocarbon, a saturated aliphatic secondary amine containing less than five carbon atoms and a saturated aliphatic aldehyde.

25. An age resisting rubber product comprising the vulcanization product of a rubber stock containing prior to the vulcanization of said stock a reaction product of substantially equi-molecular proportions of a phenol, a straight chain secondary aliphatic amine containing less than five carbon atoms and a saturated aliphatic aldehyde.

26. An age resisting rubber product comprising the vulcanization product of a rubber stock containing prior to the vulcanization of said stock a reaction product of substantially equi-molecular proportions of a mono hydroxy substituted aromatic hydrocarbon, a secondary aliphatic amine containing less than five carbon atoms and formaldehyde.

27. An age resisting rubber product comprising the vulcanization product of a rubber stock containing prior to the vulcanization of said stock a reaction product of substantially equi-molecular proportions of a phenol, diethylamine and formaldehyde.

ALBERT M. CLIFFORD.